(12) United States Patent
Peirson, Jr. et al.

(10) Patent No.: US 8,650,038 B2
(45) Date of Patent: Feb. 11, 2014

(54) SYSTEMS AND PROCESSES FOR OBTAINING AND MANAGING ELECTRONIC SIGNATURES FOR REAL ESTATE TRANSACTION DOCUMENTS

(76) Inventors: William Howard Peirson, Jr., Dallas, TX (US); Chris Alexander Peirson, Dallas, TX (US)

( * ) Notice: Subject to any disclaimer, the term of this patent is extended or adjusted under 35 U.S.C. 154(b) by 646 days.

(21) Appl. No.: 12/175,230

(22) Filed: Jul. 17, 2008

(65) Prior Publication Data

US 2009/0025087 A1    Jan. 22, 2009

Related U.S. Application Data

(60) Provisional application No. 60/950,320, filed on Jul. 17, 2007.

(51) Int. Cl.
*G06Q 10/00* (2012.01)
(52) U.S. Cl.
USPC .......................................................... 705/1.1
(58) Field of Classification Search
USPC .......................................................... 705/1.1
See application file for complete search history.

(56) References Cited

U.S. PATENT DOCUMENTS

| | | | |
|---|---|---|---|
| 5,615,268 A | 3/1997 | Bisbee et al. | |
| 5,659,616 A | 8/1997 | Sudia | |
| 5,748,738 A | 5/1998 | Bisbee et al. | |
| 6,237,096 B1 | 5/2001 | Bisbee et al. | |
| 6,367,013 B1 | 4/2002 | Bisbee et al. | |
| 6,442,594 B1 * | 8/2002 | Ouchi | 709/206 |
| 6,904,416 B2 * | 6/2005 | Nassiri | 705/51 |
| 6,931,549 B1 * | 8/2005 | Ananda | 726/26 |
| 7,020,645 B2 | 3/2006 | Bisbee et al. | |
| 2002/0053021 A1 * | 5/2002 | Rice et al. | 713/155 |
| 2002/0069179 A1 * | 6/2002 | Slater et al. | 705/67 |
| 2003/0110227 A1 * | 6/2003 | O'Hagan | 709/206 |
| 2004/0093493 A1 | 5/2004 | Bisbee et al. | |
| 2005/0177389 A1 | 8/2005 | Rakowicz et al. | |
| 2006/0117015 A1 | 6/2006 | Bisbee et al. | |
| 2006/0161781 A1 | 7/2006 | Rice et al. | |
| 2007/0079128 A1 * | 4/2007 | Cheng et al. | 713/176 |
| 2007/0118391 A1 * | 5/2007 | Malaney et al. | 705/1 |

OTHER PUBLICATIONS

International Preliminary Report on Patentability issued in corresponding International Application No. PCT/US2008/070335 on Oct. 28, 2009, 8 pages.
International Search Report and Written Opinion of the International Searching Authority issued in corresponding International Application No. PCT/US2008/070335 on Oct. 22, 2008, 8 pages.
Office Action issued in Mexican Patent Application No. 10000619 dated Jun. 22, 2012; 4 pages.
Office Action issued in Mexican Patent Application No. 10000619 dated Dec. 6, 2012; 5 pages.

* cited by examiner

*Primary Examiner* — Naresh Vig
(74) *Attorney, Agent, or Firm* — Fish & Richardson P.C.

(57) ABSTRACT

Systems and processes may obtain and manage electronic signatures for documents for real estate transactions. Documents for real estate transactions may be received and/or generated by the system. The documents may include metadata or software keys that are associated with signature blocks on the documents. The system may identify the signature blocks using the metadata or software keys and present the positions for signature by the user.

20 Claims, 18 Drawing Sheets

SYSTEMS AND PROCESSES FOR OBTAINING AND MANAGING ELECTRONIC SIGNATURES FOR REAL ESTATE TRANSACTION DOCUMENTS

RELATED APPLICATION

This application claims the priority under 35 U.S.C. §119 of Provisional Application Ser. No. 60/950,320, filed Jul. 17, 2007.

COPYRIGHT NOTICE

Portions of this patent document contain material that is subject to copyright protection, including portions of interfaces. The copyright owner has no objection to the facsimile reproduction by anyone of the patent document or the patent disclosure as they appear in the Patent and Trademark Office patent file or records, but otherwise reserves all copyrights whatsoever.

TECHNICAL FIELD

The present invention relates to obtaining signatures on documents related to a real estate transaction and, more particularly, to obtaining electronic signatures on documents related to real estate transactions.

BACKGROUND

Currently, documents for real estate transactions (e.g., sale, refinancing, etc.) are created by the various parties involved in the transaction, such as lenders, title companies, attorneys, etc. During closing, the documents are printed and presented to the parties (e.g., buyers and sellers) to the transaction for signature. However, often the parties do not review the documents and/or do not sign the documents in all the required positions for signatures, which thus delays completion of the transaction. Delays in completion of a transaction may result in extra costs to a borrower (e.g., if the borrower's interest rate is locked in for a fixed period), to the lender due to lost interest resulting from the delay, and to the title company due to time lost.

SUMMARY

Systems and processes may manage and obtain electronic signatures for real estate transaction documents. The documents for a real estate transaction may be received and/or generated by the system. The documents may include metadata or software keys that are associated with signature blocks on the documents. The system may identify the signature blocks using the metadata or software keys and present the positions for signature by the parties to the transaction. The metadata or software keys may also identify whose signature is required (e.g., first buyer, second buyer). Electronic signatures for the documents may be received and applied to the identified signature blocks. The documents may also be sealed such that alteration and/or tampering of the documents may be identified. The documents may be stored in the system and/or transmitted to remote systems for storage.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 10 illustrates an example of an interface for receiving notary information.

FIG. 12 illustrates an example interface for presenting a report.

Like reference symbols in the various drawings indicate like elements.

DETAILED DESCRIPTION

Commercial and residential real estate transactions (e.g., transfer, sale, refinancing, etc.) may involve a variety of documents, such as disclosures, loan documents, title documents, etc. Systems and processes may obtain and manage (e.g., capture, digitize, store, secure and apply) signatures of real estate transaction documents. Real estate transaction documents may be presented to users for review and/or approval. Positions in the documents (e.g., areas or portions of a document) that require signatures may be identified and presented for electronic signature. Users may electronically sign positions in documents, as appropriate.

Figure 1:
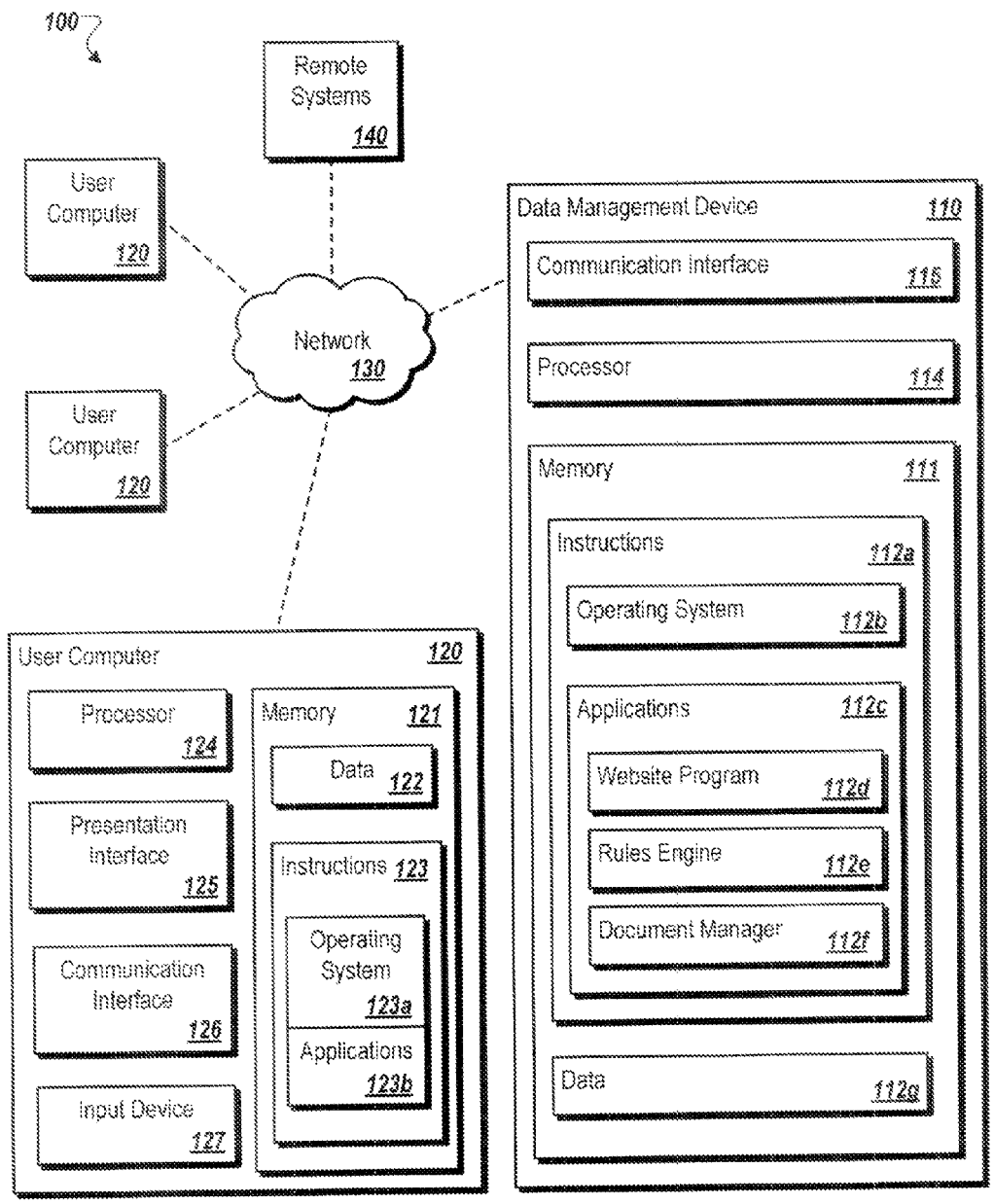
FIG. 1 illustrates an example of a system for obtaining electronic signatures.

FIG. 1 illustrates an example system 100 for obtaining and managing signatures for real estate transaction documents. An enterprise (e.g., corporation, service provider, etc.) may have a data management device to facilitate management of real estate transactions data. Real estate transactions often include data and numerous documents. Frequently, changes may be made to the documents after initial creation of a document and, thus, including a centralized repository through which the many parties of a real estate transaction may interact on a controlled and secure basis, may improve real estate transaction document management.

A data management device 110 may be coupled to one or more user computers 120 via a network 130. The data management device 110 may be a server or other computer system that includes a memory 111. Instructions 112a, operating systems 112b, and/or applications 112c, such as website(s) 112d, a rules engine 112e, and/or a document manager 112f may be stored on memory 111. The website program 112d may generate websites that provide an interface to facilitate access to documents stored in a memory and/or to facilitate creation of new documents by users. The website may be accessed through the Internet, in some implementations. The rules engine 112e may apply one or more rules, such as rules provided by governmental agencies (e.g., usury laws, tax laws, etc.) and/or industry standards, to the documents. The document manager 112f may retrieve, allow modification of, and/or create documents. The document manager 112f may generate and/or identify signature indicators, which are associated with signature blocks (e.g., positions in documents for signature, such as near a signature line). The document manager 112f may generate signature indicators by identifying positions for signature in the documents (e.g., signature blocks) and/or identifying specified text (e.g., text in white or "hidden" text that is identifiable by the system but not visible when presented to users, text such as "signature", "borrower", etc.). The document manager 112f may generate the documents and include signature indicators, such as metadata (e.g., text, software keys, etc.), that facilitate identification of signature blocks within generated documents. The memory 111 may also store data 112g, such as rules (e.g., usary laws, best practices, etc.) to be applied by a rules engine 112e, documents, user information, etc. The memory 11 may also include data 112g, such as the data used to generate real estate transaction documents, what text is "specified text" for purposes of identifying signature indicators, etc.

The data management device 110 also includes a processor 114 to execute the instructions 112a and/or save and/or retrieve data 112h. The processor 114 may execute the document manager 112f to generate documents, identify signature positions of the documents, and/or seal the documents so that future alteration of the documents may be evident and identifiable. The document manager 112f may generate signed documents based on received signatures; generate documents such that access to the documents (e.g., signed or unsigned is inhibited (e.g., encrypted files); and/or generate documents such that when documents are accessed, information related to the access (e.g., accessing party, time, date, type of access, whether data was modified, what portions of the document were presented, etc.) may be associated and/or stored with the generated documents. The data management device 110 also includes a communication interface 115 that may facilitate data transfer between the data management device 110 and the user computers 120 and/or the remote systems 140 using the network 130. For example, communication interface 115 may facilitate the retrieval of documents from remote systems 140 (e.g., databases, web servers, or other computer systems) using the network 130. The communication interface 115 may also receive electronic signatures from input devices of the user computer. The communication interface 115 may transmit signed documents to remote systems for storage.

A user may access websites 112d to review and/or electronically sign documents using a user computer 120. Some users may access the websites 112d using the user computer 120 to provide data that may be used to generate the real estate transaction documents. The user computer 120 may be a personal computer, laptop, personal digital assistant (PDA), smart phone, or other suitable computer, and may include input devices such as a digital signature pad, touch screen, stylus, etc.

As illustrated in FIG. 1, a user computer 120 may include a memory 121 to store data 122 and instructions 123, such as an operating system 123a and/or other applications 123b. The user computer 120 also includes a processor to execute instructions and/or to access and/or manipulate data 122. The user computer 120 may include a presentation interface to present, for example, webpages 112d and/or other interfaces provided by the data management device 110. The user computer 120 also includes a communication interface 126 to facilitate communication with other systems through the network 130. The user computer may also include one or more input devices, such as keyboards, signature pads, touch screens, light pens, and mice, to facilitate obtaining signatures from a user.

Figure 2A:
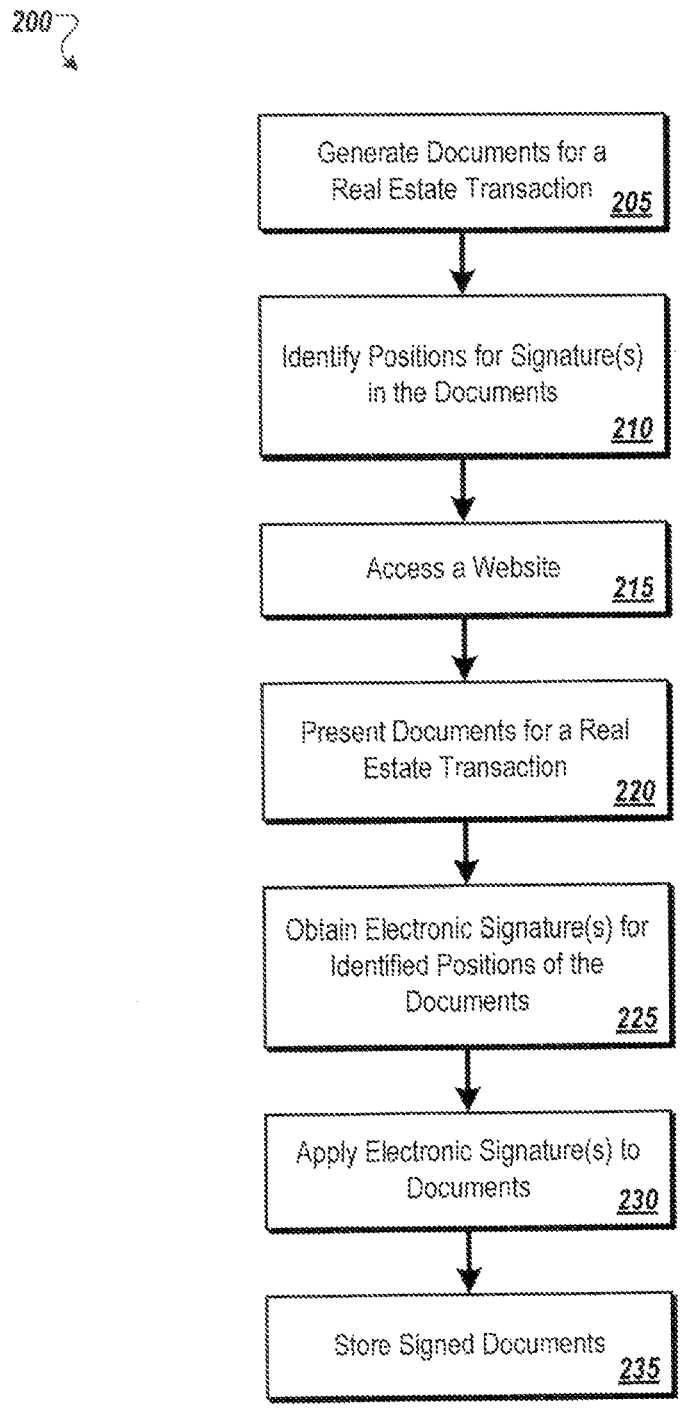
FIG. 2A illustrates an example of a process for obtaining and managing real estate transaction documents.

FIG. 2A illustrates a process for obtaining and managing signatures for real estate transaction documents that may be performed by systems, such as system 100 illustrated in FIG. 1. Documents for the real estate transaction may be generated (operation 205). For example, a centralized repository may include information provided by one or more parties to a real estate transaction and the documents related to the real estate transaction may be generated based on the information stored in the repository. Documents, such as loan documents, title documents, and other documents, may also be retrieved or otherwise accessed from a memory, for example, for a sale of a parcel of property.

Positions for signature in the documents may be identified (operation 210). For example, signature indicators in documents may be identified. Signature indicators in documents may include metadata, such as text (e.g., borrower name, party type, etc.), and the system may identify the text and present the signature block associated with the text for signature by the user, as appropriate. The text may be white or the color of the background of the document so that this text does not appear when the document is printed. As another example, a signature indicator may include metadata or other software key that identifies the signature block. The system may identify the metadata or software key and present the portion associated with the metadata for signature by a user. The metadata or software key may identify the person whose signature is required in the signature block (e.g., which buyer, seller, etc. should sign the signature block).

A website may be accessed (operation 215) by a user. For example, a party to a real estate transaction (e.g., primary seller, secondary seller, buyer, etc.) may access a website coupled to a data management system.

The documents for the real estate transaction may then be presented (operation 220). For example, a user may be presented with the document or portions thereof for review and/or approval on the website. A user may be required (e.g., by government and/or industry regulations) to indicate approval and/or the ability to view the documents prior to being able to electronically sign the documents.

Electronic signatures for the identified positions may then be obtained (operation 225). For example, a user may sign a digital signature pad (e.g., such as signature pads commercially available from Topaz Systems, Inc., Simi Valley, Calif.) coupled to a user computer. As another example, an indication of the user's signature may be used to sign the identified positions (e.g., indicating signature by typing the user's name or selecting a button that indicates that a signature should be added to the document). The positions for signature may be presented automatically to a user (e.g., sequentially) and the user may sign the documents or portions thereof (e.g., using a digital signature pad or other type of electronic signature) or not sign the documents or portions thereof (e.g., when reviewing the document as opposed to signing the document). Signature may be required prior to proceeding to sign other portions of the document, in some implementations. This may reduce the number of missing signatures from the documents. Reducing missed signatures may reduce delays to parties to the transaction that might be caused by the missing signatures. In addition, reducing the risk of missing signatures may reduces costs to parties that facilitate the transactions, such as a title company, since as thorough a review of the signatures may not be required (e.g., when signature is required before proceeding to later signatures, when a signature sequence of the signature blocks is specified and signature out of order is inhibited).

In some implementations, rather than applying the signature to each position, the signature may be applied to more than one position or the entire document concurrently. The system may apply the user signature to the entire document. (operation 230). The signed documents may be stored (operation 235). For example, the signed documents may be stored in a memory of the system and/or on remote systems, such as the MERS® e-Registry system.

Process 200 may be implemented by system 100 or similar systems. In addition, various operations may be added, deleted, modified, or reordered in process 200. For example, positions in the document may be identified based on the user logged onto the system. When a primary borrower is logged onto the system, the documents and/or positions in the documents for signature by the primary borrower may be identified and presented to the primary borrower. However, when a seller is logged onto the system, similar and/or different documents or signature positions may be identified and/or presented to the user. As another example, documents may be generated by the system prior to retrieving the documents. In addition, electronic signatures may be added to the document as they are received for a document or after signature of all signature blocks of the document. As another example, after signature by both parties, a secure version of the signed documents may be saved and/or transmitted to remote systems. Secure versions may identify the date of creation and/or signature. Secure versions may also inhibit alteration of documents. In addition, the signed documents may be automatically transmitted (e.g., to county record departments, to lenders, to buyers, to sellers, etc.). Furthermore, signatures on the electronic documents may be verified (e.g., using forensic information related to signatures and/or biometric information).

Figure 2B:
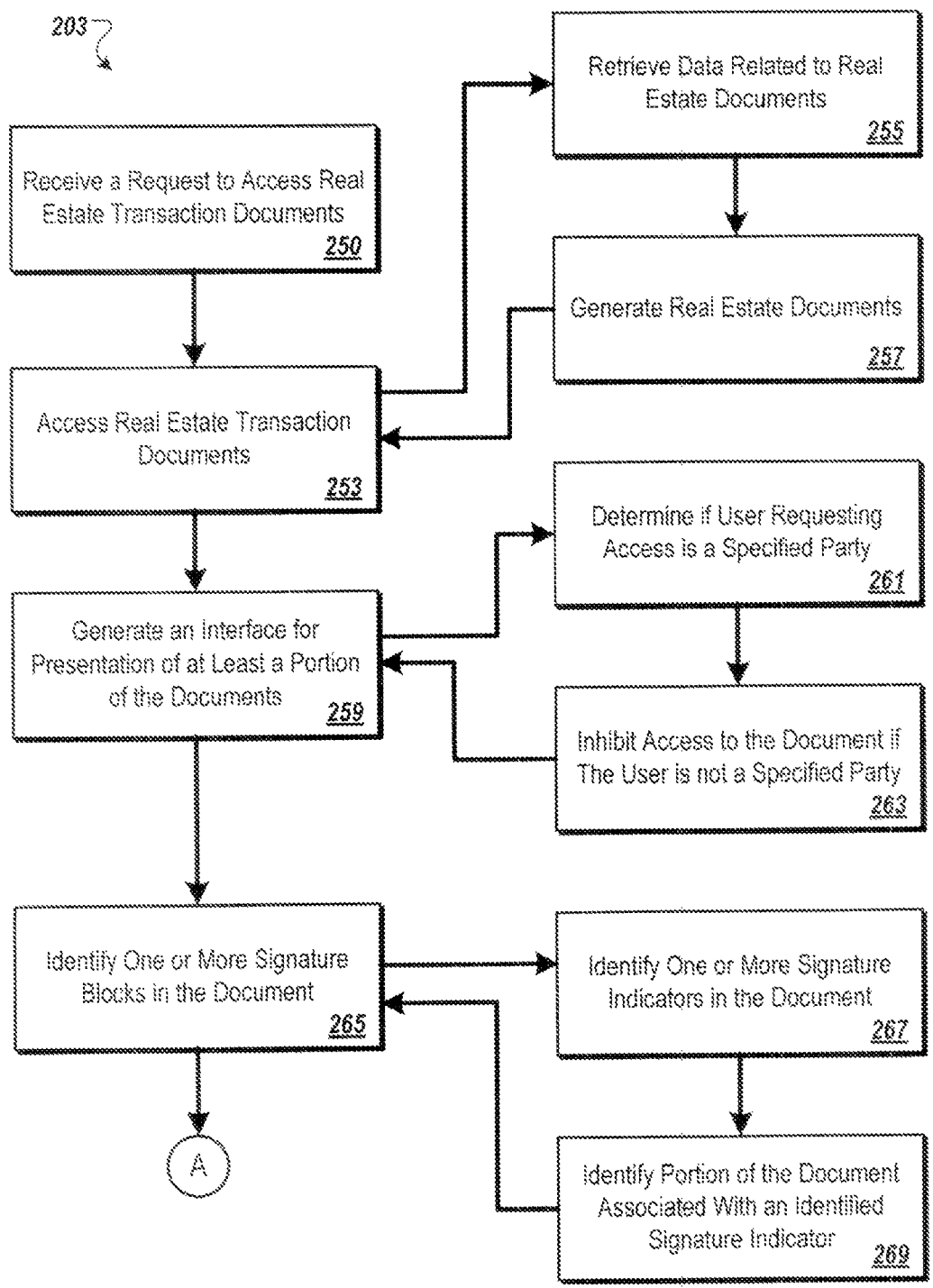
FIGS. 2B-D illustrate an example process for obtaining and managing real estate transaction documents.
Figure 2C:
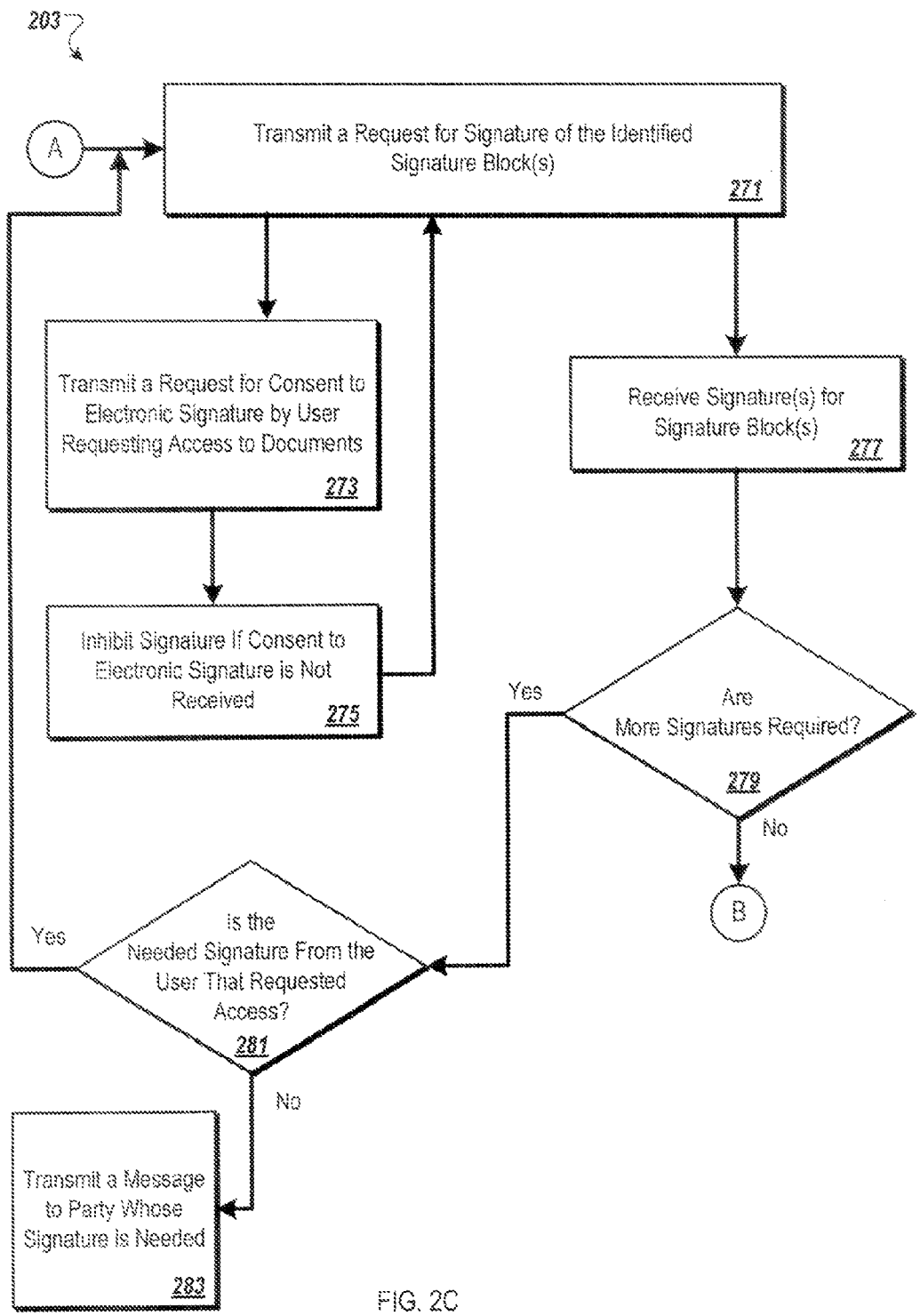
Figure 2D:
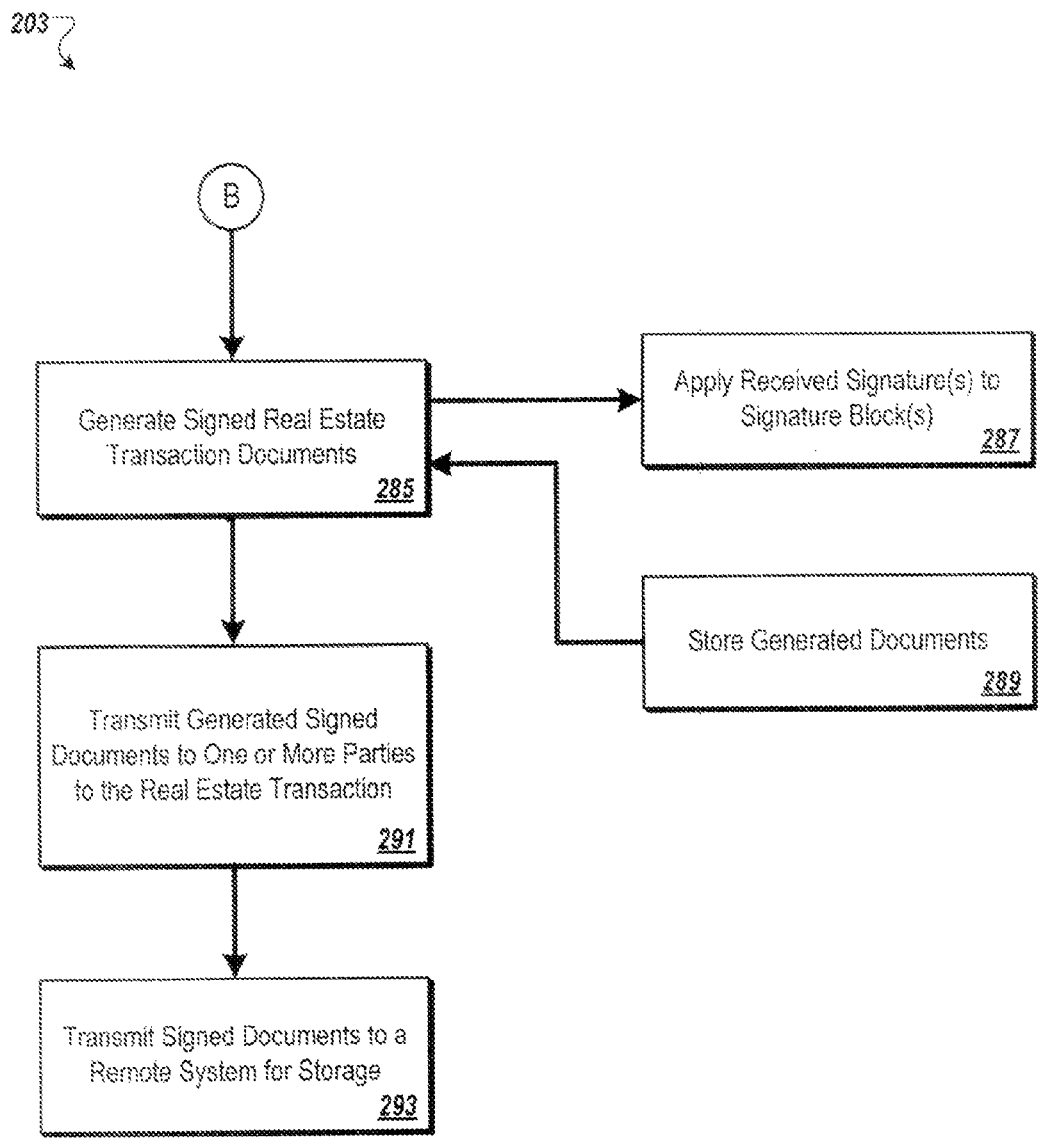

FIGS. 2B-D illustrate an example process for managing real estate transaction documents. A request to access real estate transaction documents may be received (operation 250). For example, a user may access a website on the Internet to request access to documents related to the purchase of a new home.

Real estate transaction documents may be accessed (operation 253). Data related to the real estate transaction documents may be retrieved (operation 255) and the real estate documents may be generated (operation 257). For example, data specific to the real estate transaction may be retrieved and the data may be used to populate forms (e.g., stored in a memory of the system) for use in the real estate transaction.

An interface for presentation of at least a portion of the documents may be generated (operation 259). The interface may facilitate viewing and reviewing of the real estate transaction documents by the user requesting access. A determination may be made whether the user requesting access is a specified party (operation 261) and access to the real estate transaction documents may be inhibited if the user is not a specified party (operation 263). For example, access to real estate transaction documents may be restricted. In some implementations, specified parties, such as parties to the transaction (e.g., lender, borrower, etc.) and parties facilitating the transaction (e.g., title company), may be allowed to access the documents, while others are inhibited from accessing the documents. Specified parties may be identified by user information provided by a user. The type of access allowed by each party may also depend on the user. For example, borrowers may be inhibited from modifying information on the real estate transaction documents (e.g., payee name and/or payee description); lenders may be allowed to modify a portion of the information (e.g., amounts, interest rates, etc.), but may be inhibited from modifying other types of information (e.g., disclosures, property address, etc.).

One or more signature blocks in the document may be identified (operation 265). For example, signature blocks for a borrower may be identified. In some implementations, the signature blocks may be identified at least partially based on the user. As an example, if the user requesting access is the seller, the signature blocks for seller may be identified and the signature blocks for the borrower may not be identified. Signature indicator(s) in the document may be identified to identify the signature blocks in the document (operation 267). For example, signature indicators may include metadata in real estate transaction documents. A search may be performed to identify the metadata in the real estate transaction documents that are signature indicators. As another example, a signature indicator may be text that is white (e.g., such that the text may be identified by the system, but may not be presented or viewable by a user) or hidden. A search for the white text or hidden text may be performed to identify the signature blocks in real estate transaction documents. As another example, software keys may mark positions of the signature blocks in a real estate transaction documents.

The portion of the document associated with the identified signature indicator may also be identified (operation 269). The portion of the document may be presented to a user.

A request for signature of the identified signature block(s) may be transmitted (operation 271). For example, a portion of the real estate transaction document may be presented to the user through the interface and the user may be prompted, through the interface, to sign a signature block associated with the presented portion. A request for consent to electronic signature of the real estate transaction documents may be transmitted (operation 273). For example, an interface such as a webpage or a pop-up window may be presented to the user with a consent agreement for the use of an electronic signature rather than a handwritten signature. A user may select a link or a button to indicate acceptance. In some implementations, a user may be required to provide a code that appears on the consent agreement to indicate that the user consents to the agreement. Signature of the real estate transaction documents may be inhibited if the consent to electronic signature is not received (operation 275). For example, the user may not be able to proceed to the interface configured to receive the signature, if the user does not consent to electronic signature of the real estate transaction documents. As another example, a message may be transmitted to one or more parties (e.g., lender, title company, etc.) that the user does not consent to electronic signature. A user may be able to view the real estate transaction documents even if the consent to electronic signature is not received.

Signature(s) may be received for the signature block(s) (operation 277). For example, a user may utilize a digital signature pad to send a signature for a signature block. As another example, a user may enter his name in an acceptable electronic signature format.

A determination may be made whether more signatures are required (operation 279). For example, a determination may be made whether signatures have not been received for the user requesting access and/or for any users. A determination may be made whether signatures are needed from the user that requested access (operation 281) and if more signatures are required, then a request may be transmitted for signature of the signature blocks that have not been signed (operation 271). If signatures from the user who requested access are not needed, but signatures from other users are required, a message may be transmitted to the party whose signature is needed (operation 283).

Signed real estate transaction documents may be generated (operation 285). The documents may be generated such that access is restricted (e.g., encrypted) or inhibited. The documents may be generated such that when a document is accessed, access information (e.g., assessor name, time and date of access, type of access such as modification or presentation, etc.) may be obtained. The access information may be associated with and/or stored with the generated documents.

Received signatures may be applied to the signature block(s) of the real estate transaction documents (operation 287). The generated signed real estate transaction documents may be stored (operation 289).

The signed real estate transaction documents may be transmitted to one or more parties to the real estate transaction (operation 291). For example, the real estate transaction documents may be emailed to the borrower(s), seller(s), and/or lender(s). As another example, the real estate transaction documents may be automatically sent to recording agencies, such as county record divisions.

The signed real estate transaction documents may be transmitted to a remote system for storage (operation 293). The real estate transaction documents may be securely stored. For example, access may be inhibited. As another example, the real estate transaction documents may be transmitted to a MERS system or similar system.

Process 203 may be implemented by system 100 or similar systems. In addition, various operations may be added, deleted, modified, or reordered in process 203. In some implementations, signature indicators may be generated. For example, specified text may be identified (e.g., "signature", "borrower", hidden text, etc.) and the signature indicator may be generated. As another example, when documents are generated, the signature indicator may be generated as well. In some implementations, the user may provide a signature one time and apply the signature to more than one signature block (e.g., provide one signature for the real estate transaction documents and/or provide one signature for a portion of the real estate transaction documents, such as the HUD section). In some implementations, signed documents may be generated even when additional signatures are needed. For example, the signed documents may be generated after the borrower and/or co-borrower have provided signatures and then generated again after the seller has provided signatures.

In some implementations, a notary public ("notary") may witness signatures for real estate transaction documents. A notary may be inhibited from signing real estate transaction documents until a user, whose signature is being witnessed, has signed the real estate transaction documents. A notary may witness and/or provide a signature indicating the witnessing of a signature for each signature block or for the real estate transaction documents.

In some implementations, a sequence for the signature of documents may be specified. For example, signature of other portions of the real estate transaction documents (e.g., security documents) may be inhibited until the note in the real estate transaction documents is signed. As another example, signature of a consent (e.g., consent to electronic signature or other appropriate consents) may be requested prior to allowing signature of the real estate transaction documents. Signature of the real estate transaction documents may be inhibited unless the signature of the consent is received. In some implementations, the sequence for the signature of the documents may be retrieved (e.g., from a memory of the system), portions of the documents may be presented through the interface in the sequence for signature, and/or signatures may be requested based on the specified sequence. Signature of the real estate transaction documents may be inhibited if the signatures are not provided according to the specified sequence.

In some implementations, the signed real estate transaction documents may be generated after the parties have transmitted electronic signatures for the real estate transaction documents. Each party may transmit signatures for the real estate transaction documents separately and/or concurrently.

Figure 3:
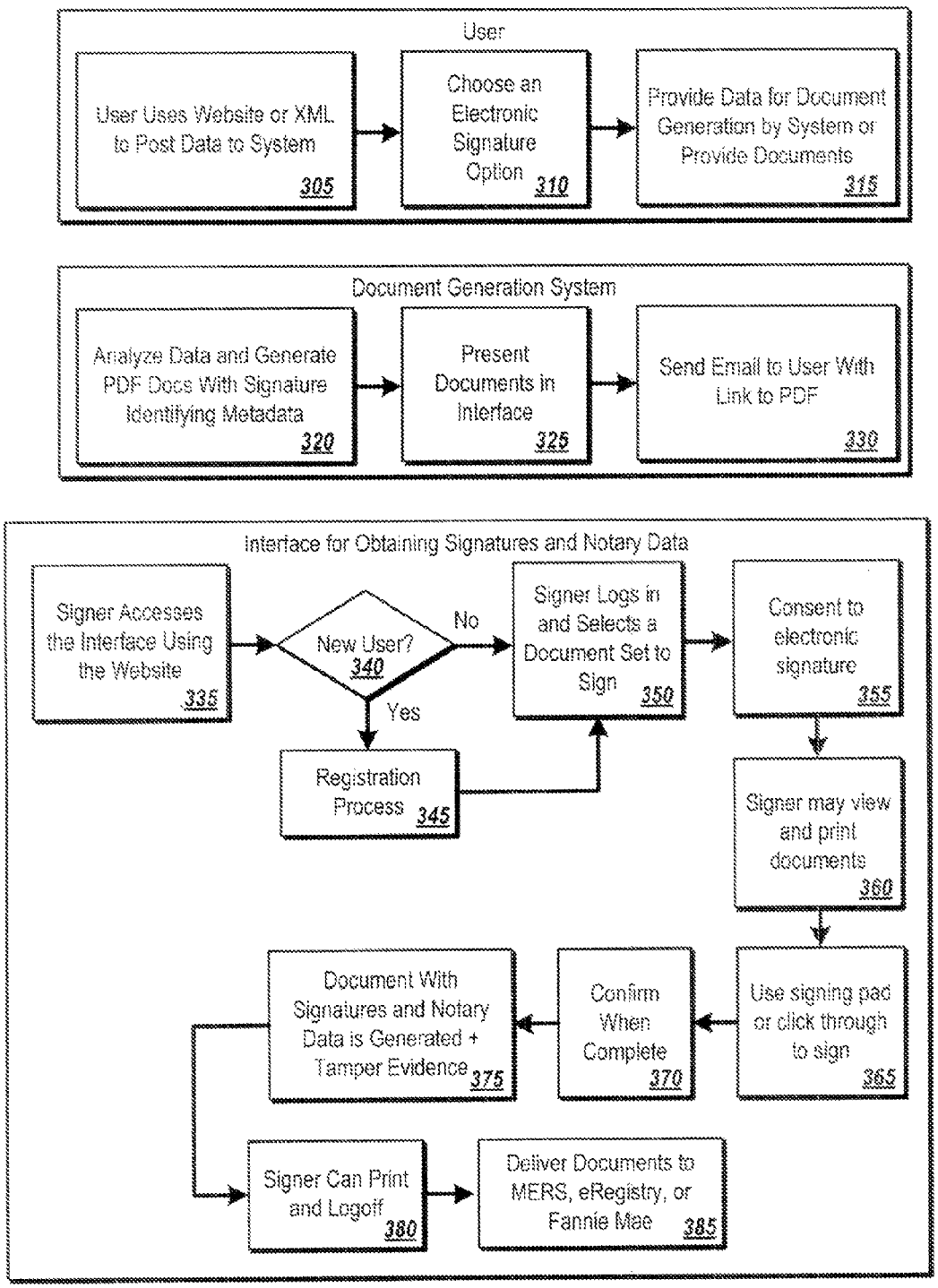
FIG. 3 illustrates an example of a process for obtaining and managing real estate transaction documents.

FIG. 3 illustrates another example of a process for managing and obtaining signatures for electronic documents performed by systems, such as system 100 illustrated in FIG. 1. A user (e.g., title company, lender, etc.) may use the website coupled to the system to post data to the system or a user may transmit the data via XML post (operation 305). An electronic signature option for the real estate transaction may be selected by the user (operation 310). For example, the level of security applied to the transaction, the type of signature verification performed, and/or the security applied to the documents after signature may be selected by the party initiating the process. The user may then provide the data for document generation by the system and/or provide documents for signature (operation 315).

If the user provides data from which the documents required for the real estate transaction may be generated, then the data may be analyzed according to stored rules and the documents may be generated (operation 320). For example, analyzing data may include, but is not limited to, analyzing the data according to HOEPA (Home Ownership and Equity Protection Act) rules and state high-cost calculation rules, industry compliance rules, business rules, data verification rules, and anti-fraud rules. The documents may be generated as PDF (portable document format) documents. In addition, the documents may be generated with signature indicators, such as signature identifying metadata (e.g., white text, software keys, etc.). The signature identifying metadata may facilitate identification of the signature blocks by the system.

In some implementations, the generation of the real estate transaction documents may be based on rules such as rules that govern the documents that must be included in a real estate transaction (e.g., specified forms, disclosures, etc.). The generation of the real estate transaction documents may be such that documents may be added to the real estate transaction documents, however, removal of one or more documents from the real estate transaction documents may be inhibited (e.g., to preserve a record of documents used in a transaction for auditing purposes and/or compliance with Fair Lending practices and/or regulations).

The documents generated may be provided to an interface presented to signatories of the documents (operation 325). A user may be presented with the interface through a website. An email to the user may be transmitted (operation 330). The email to the customer may include a link to the documents created.

Signatories in a real estate transaction may access the interface through a website coupled to the system (operation 335). A determination may be made whether the user is a new user (operation 340). If the user is a new user, the user may be allowed to begin the registration process (operation 345). If the user is not new and/or if the user has completed the registration process, the user may be allowed to log in (e.g., provide user information such as a user name, a password, biometric information, and/or other identifying information) and select a document set (e.g., related to a specific real estate transaction) to sign (operation 350).

The user may then consent to electronic signature of the documents (operation 355). For example, government and/or industry (e.g., good business practice regulations) regulations may require consent to electronic signature prior to allowing the user to proceed with the process. The user may be required to confirm the ability to view a document (e.g., a code is presented on viewed documents that the user is required to enter in a portion of the website) and/or consent to electronic presentation and/or signature of the document.

The user may then be presented (e.g., on the website) the documents (operation 360). For example, the documents may be generated for presentation to a user on the centralized repository and accessed through network protocols by a user computer for presentation to the user.

The user may then sign each portion of the document, as appropriate, using the signing pad or selecting a button that indicates approval, and a signature may be applied to the signature block of the document (operation 365). The signatures may be applied to the document or each portion of the document as the user indicates approval. In some implementations, more than one signature may be applied to the document after the borrower indicates approval of more than one portion of the document. For example, if the borrower indicates approval of the entire document, the borrower's signature may be applied to the document (e.g., globally or on each portion for signature). The user may confirm that the entire document has been signed (operation 370).

A document may be generated with the electronic signatures obtained and with security such that evidence of tampering will be apparent (operation 375). For example, the document may include a software seal that inhibits alteration of documents and/or that records alterations made and/or access to the documents. In some implementations, various rules may be applied to the real estate transaction documents prior to and/or during the generation of the signed real estate transaction documents. For example, rules related to compliance audits and certifications based on government and/or industry standards may be applied to the real estate transaction documents. Generation of the signed real estate transaction documents may be inhibited if the documents do not comply with one or more of the rules.

The user may then print and/or log off the website (operation 380). The documents with signatures may be transmitted to various parties such as MERS® or other electronic registry systems, and/or Fannie Mae (operation 385). A message (e.g., email) may be sent to parties whose electronic signatures have not been obtained, reminding the parties to visit the website and electronically sign the documents.

Process 300 may be implemented by system 100 or similar systems. In addition, various operations may be added, deleted, modified, or reordered in process 300. For example, positions document (e.g., signature blocks) may be identified based on the user that is logged into the system. As another example, documents that are generated with signatures may be automatically transmitted to various parties, such as buyers, sellers, lenders, title companies, etc. In some implementations, various consent agreements may be presented to the user as pop-up windows (e.g., consent to electronic signature). Furthermore, the signatures provided by the user may be verified based on the signature provided (e.g., on a digital signature pad) and using other factors. For example, forensic information such as signing speed, pressure points, etc., may be saved and/or analyzed to determine the signature's authenticity. In addition, this forensic data may be saved with the signing record and be readily available if a claim against the signature's authenticity is made or the document is audited. Although process 300 is described in terms of a user that is a borrower, various other users, such as sellers, may participate in this or similar processes.

FIGS. 4-9 illustrate various pages of an example website used to manage and obtain electronic signatures for documents related to real estate transactions. A user may access a website generated by the system. Access to the website may be restricted and the user may provide user information to obtain access to the website.

The system may be a web-based system that can capture signatures from the users and apply them to a PDF file that contains the closing documents. The website may maintain a list of documents to be signed by individual users. As a user begins the process, the user is allowed to view the user's documents. After the user provides consent to electronic signature, the user may be presented with at least a portion of the document for signature. The user may sign the documents by "clicking-through" (e.g., use the user's login information as authorization) or by utilizing a signing pad that collects a signature image and forensic data. Once the user has signed all of the documents, the documents may be sealed so that tampering will be evident (e.g., the signed documents may generated such that access to the documents is inhibited and/or such that access information may be recorded when the document is accessed). The documents may then be registered with a repository, such as the MERS® eRegistry, and/or delivered to the lender.

Figure 4:
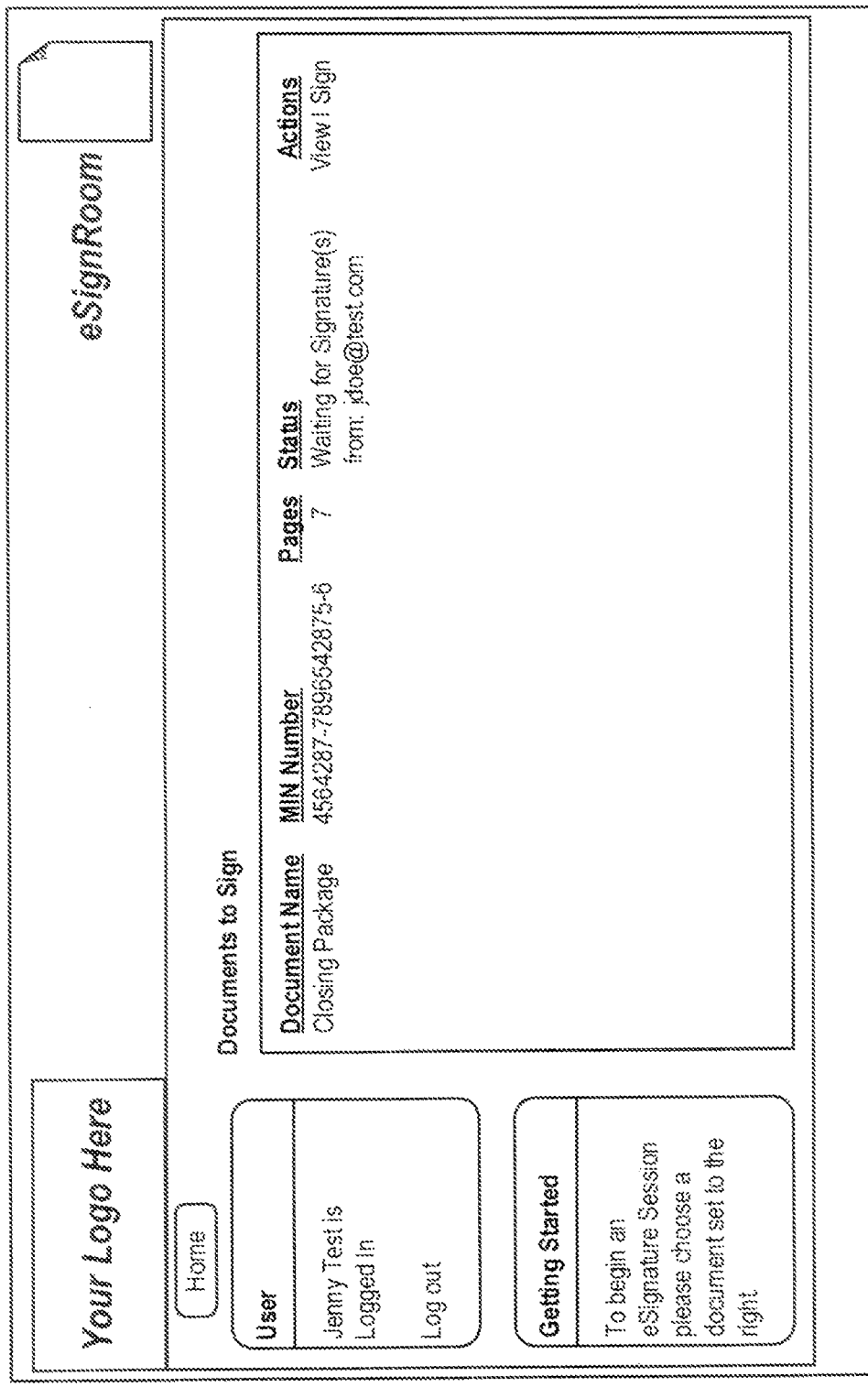
FIG. 4 illustrates an example interface for managing real estate transaction documents.

FIG. 4 illustrates an example webpage that presents a logged-on user with names of documents associated with the user. For example, once a borrower logs in, the borrower may view all documents that the borrower has signed or will sign. A status of the documents may be presented, in addition to the type of real estate transaction the documents are associated with, the number of pages, and/or options available to the user with respect to the documents. For example, the user may view and/or sign the documents.

Figure 5:
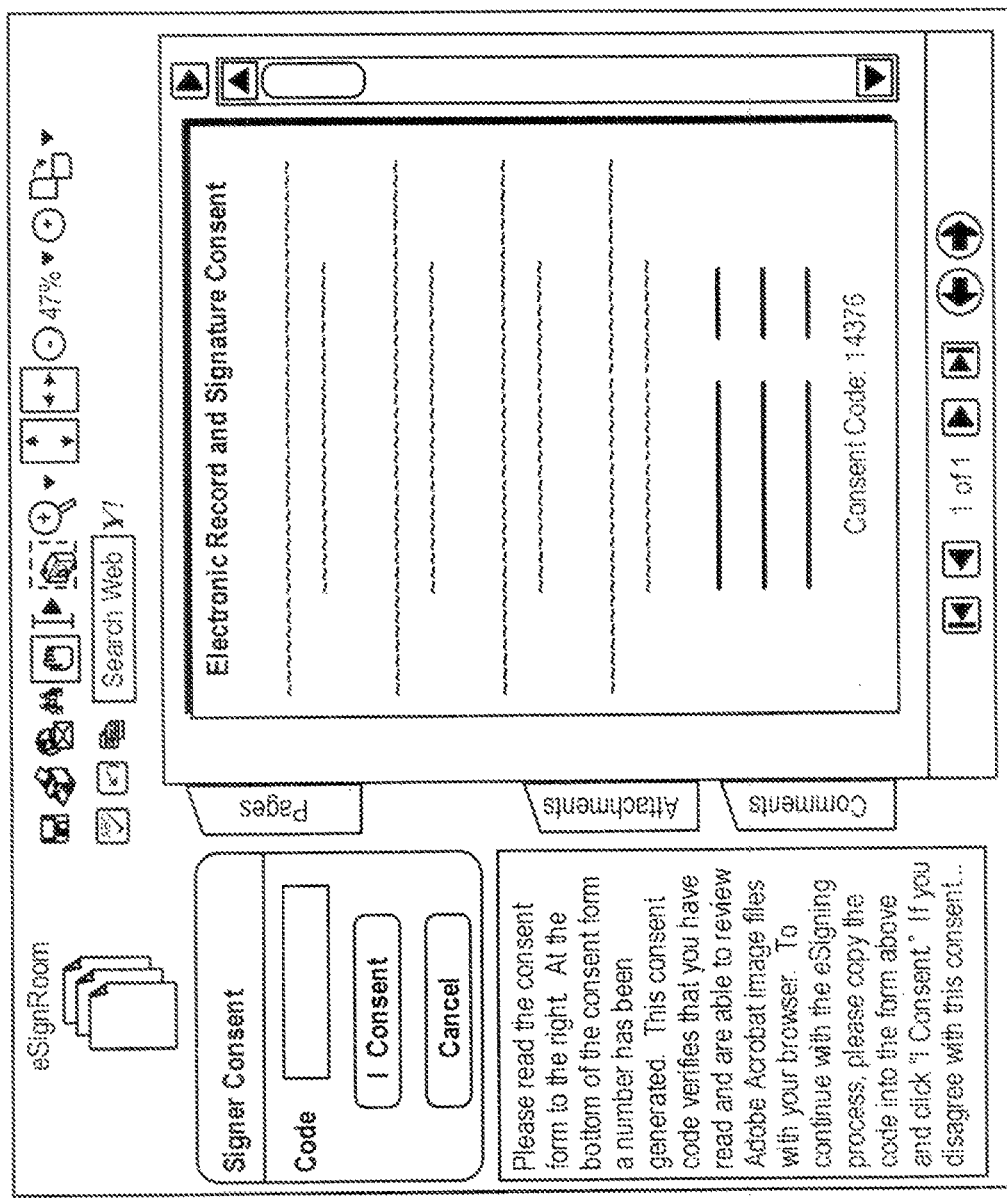
FIGS. 5-6 illustrate example interfaces for verifying consent of a user.

FIG. 5 illustrates an example webpage for verifying consent to electronic signature of documents. Government regulations may require verification of the ability to view documents in the media in which the documents are presented. For example, verification may be presented in the same format that the documents will be presented (e.g., PDF). A user may provide consent by entering a code presented on the document being viewed (e.g., consent form) in a different portion of the website. The user may also be required to consent to electronic signature of the documents. The user may also cancel the signature of the documents, rather than consenting to the electronic presentation and/or signature.

Figure 6:
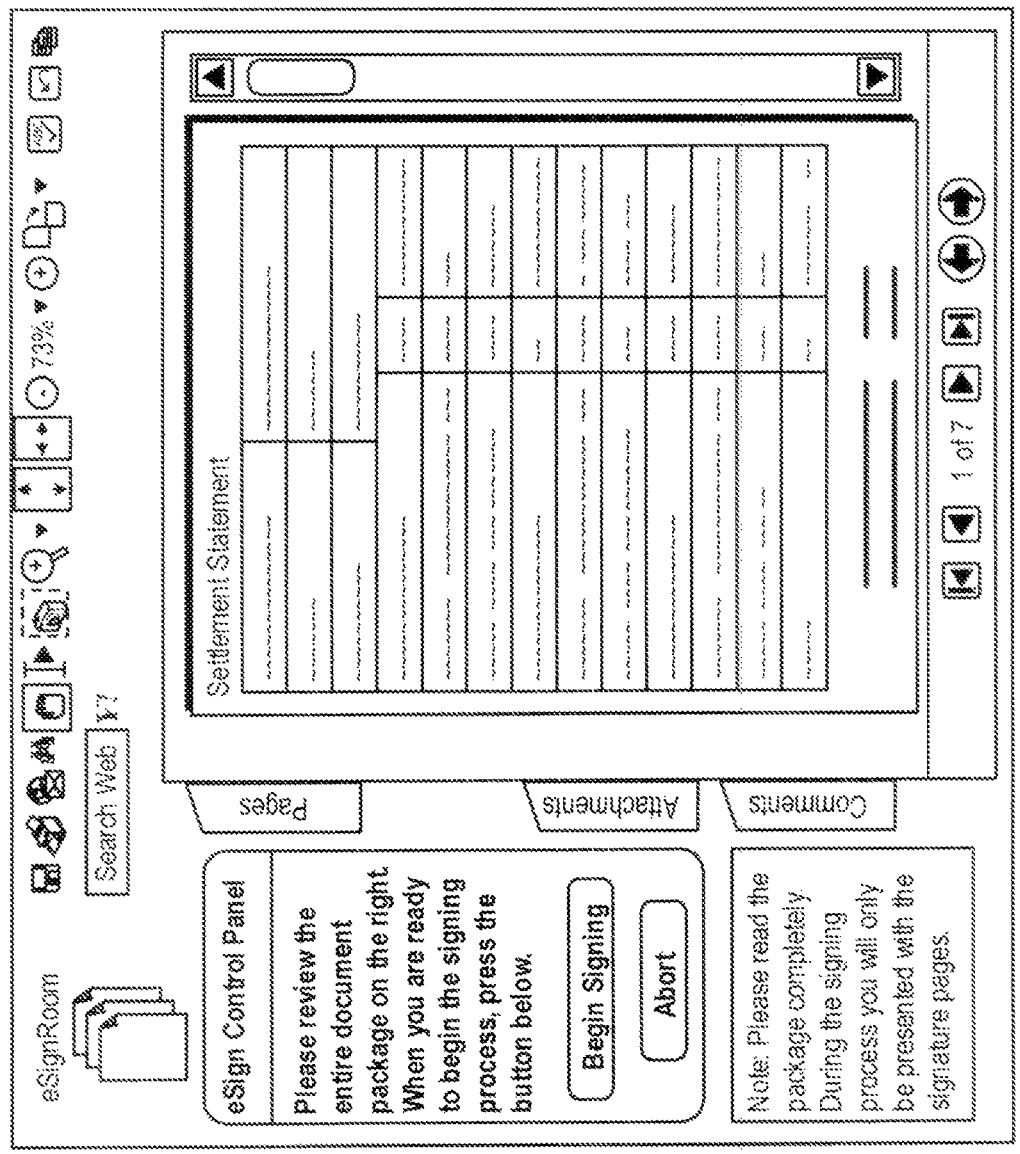

FIG. 6 illustrates an example webpage for reviewing the documents. The documents, such as RESPA-required documents and/or loan documents, may be presented to the user on the website. The user may review the documents and select to sign the documents. The user may also print and/or save a copy of the documents.

Figure 7:
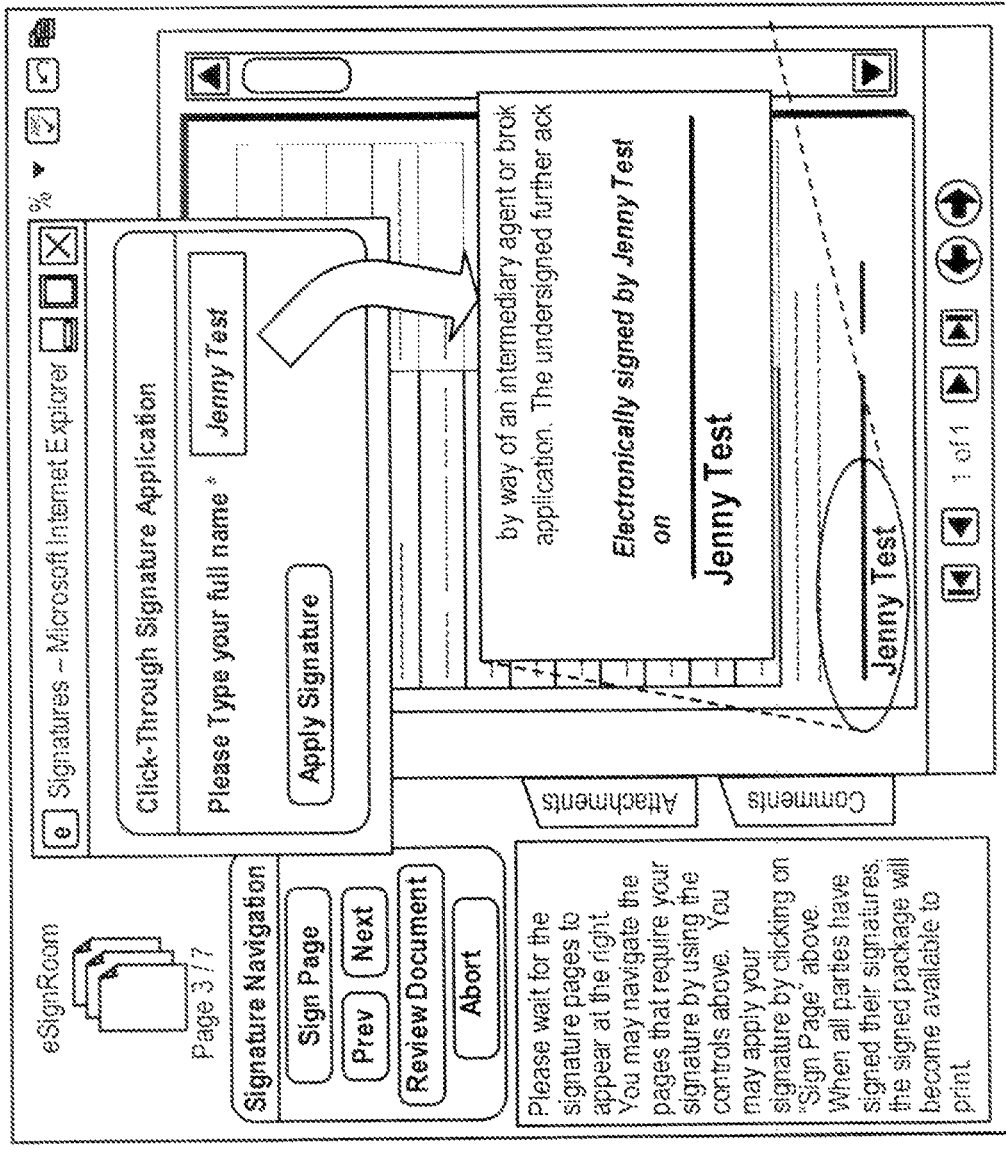
FIG. 7 illustrates an example of an interface for obtaining and managing an electronic signature of a document.

FIG. 7 illustrates an example of an electronic signature of a document. The webpage may include navigation buttons for a user to move from a signature block to the next or the previous signature block. The user may electronically sign the document(s) by clicking a button, which causes a signature to be inserted on the document(s). The user may also select to abort the signature process, review the document(s), and/or print portions of the document.

Figure 8:
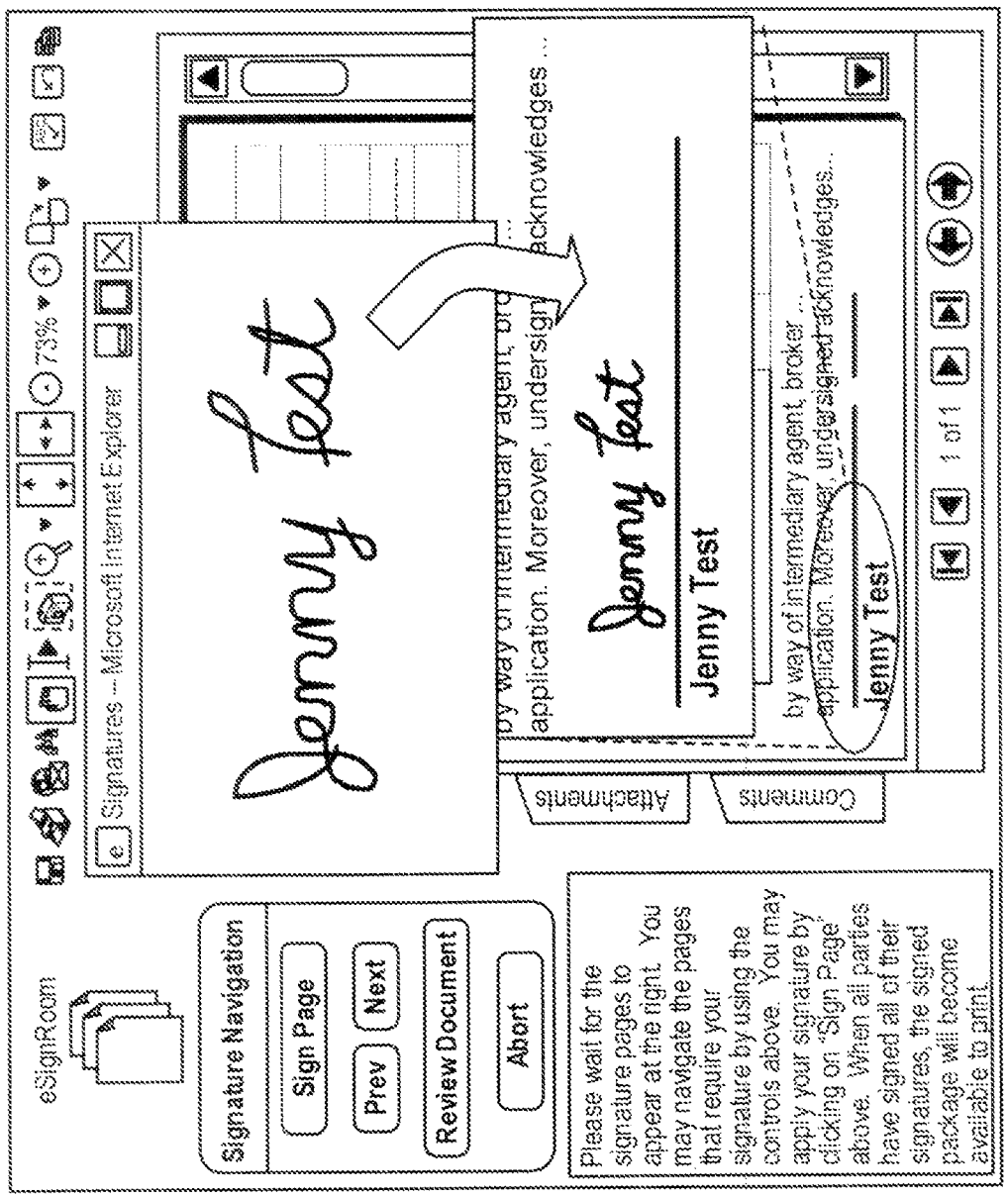
FIG. 8 illustrates another example of an interface for obtaining and managing an electronic signature of a document.

FIG. 8 illustrates another example of an electronic signature of a document. The user may be presented with a pop-up window or portion of the website in which a signature entered on a digital signature pad is presented. The electronic signature captured by the system may then be applied to the signature block and/or the signature maybe cleared and reentered.

Figure 9:
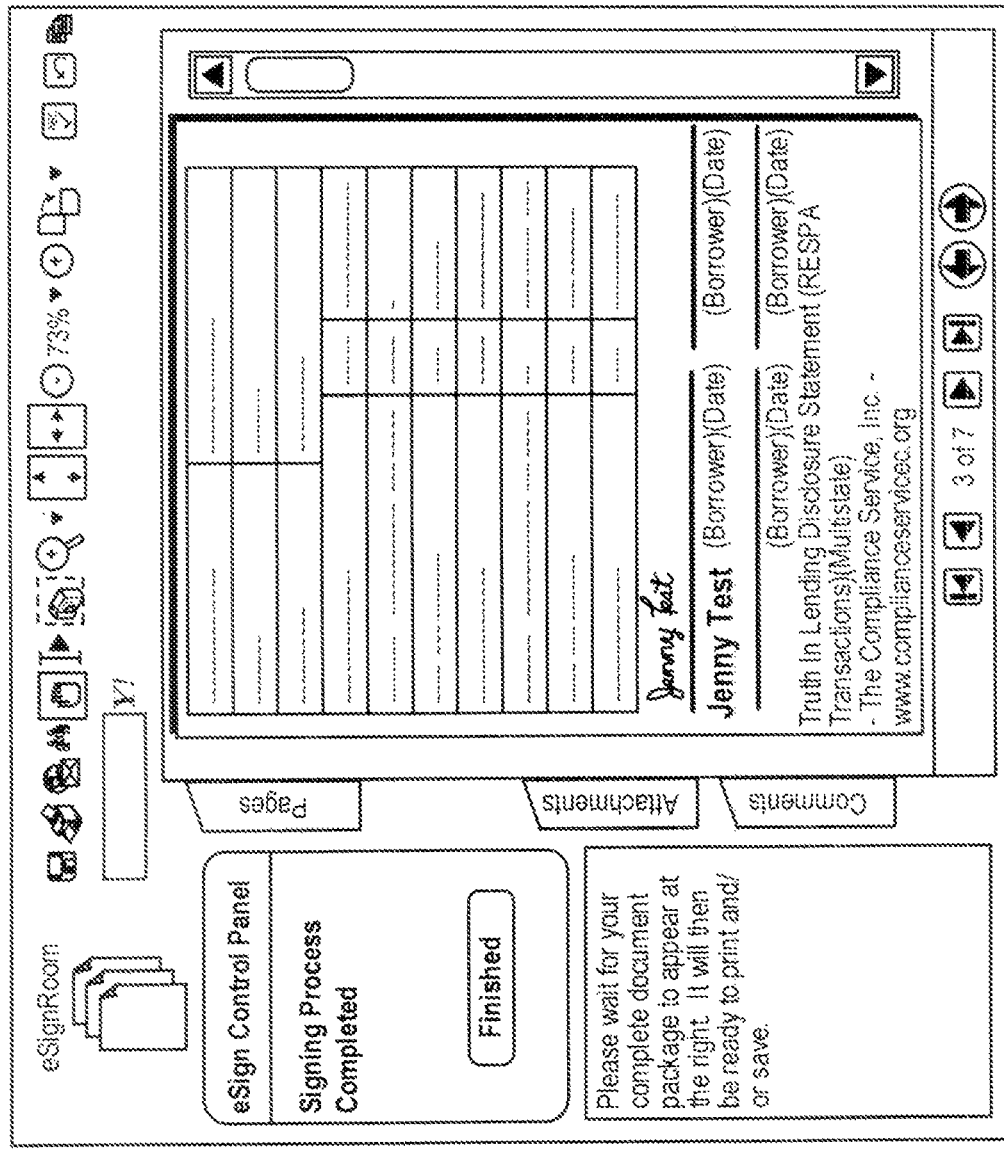
FIG. 9 illustrates an example of an interface for presenting a document generated with an electronic signature.

FIG. 9 illustrates an example of a document generated with an electronic signature. As illustrated, the document is generated with the electronic signature applied to the signature block of the document. Once signatures have been applied to the signature blocks, the user has electronically signed the documents. The signed documents may be stored (e.g., in a memory of the system and/or remote systems), presented, and/or printed.

Figure 10:
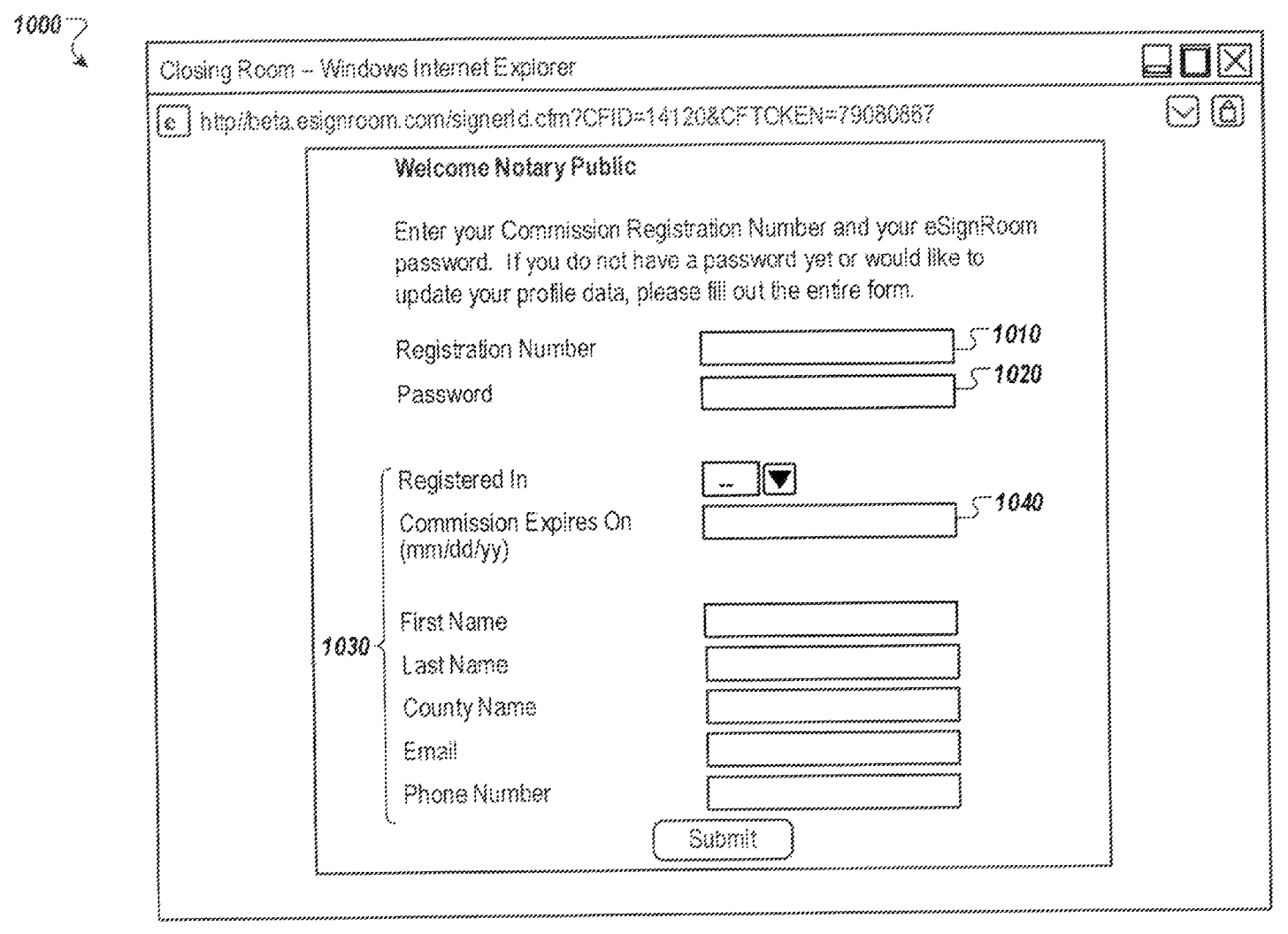

In some implementations, a signature of real estate transaction documents may need to be witnessed or notarized. FIG. 10 illustrates an example of an interface 1000 to facilitate receiving notary information. A notary may provide a user information, such as a notary registration number 1010, and a password 1020. The notary may then notarize the documents or portions thereof. The notary's signature may be stored and utilized, as desired, by the notary. For example, a notary may select a button after a user applies a signature to a document to indicate the signature was witnessed by the notary. The notary's signature may then be applied to the document and/or a signature block of the document. As another example, the notary may sign a document or portions thereof using an electronic signature pad or by typing the notary's name to indicate electronic signature. In some implementations, a notary may be inhibited from signing documents until signature of another party (e.g., borrower, lender, etc.) is received. Inhibiting notarization until after a borrower signs may increase the accuracy of information and/or facilitate compliance with government regulations.

The interface 1000 may also allow a notary to modify notary information associated with the notary. For example, the notary may provide new updated registration information 1030 (e.g., registration number, expiration date, password, place of residence, full name, title, email address, phone number, etc.) or update a commission expiration date 1040. In some implementations, the interface may require specific information, such as registration number and commission expiration date, prior to allowing a notary to sign real estate transaction documents. In some implementations, the interface may include drop-down fields for the selection of signing parties for which the notary is notarizing, drop-down fields for the selection of the state of execution and/or county of execution, fields for receiving the type of identification used to verify the identity of the party whose signature is being witnessed, and/or fields for the name of the identification witness.

In some implementations, signature indicators may be generated for the notary. Rules, such as government regulations, may identify which signatures a notary must witness. The notary may, in some implementations, store notary information to be used with documents for multiple real estate transactions. The notary may provide a signature for multiple signature blocks and/or for multiple parties to a transaction, in some implementations. A signature by a notary may be inhibited until parties, whose signatures the notary is witnessing, have signed the real estate transaction documents.

In some implementations, a notary may be required to provide real estate transaction specific information. Thus, the system may inhibit a notary from accessing and/or signing real estate transaction documents until the specific information is transmitted to the system.

In some implementations, the signature of the notary may be managed by government regulations, such as a requirement that the notary sign an acknowledgement form or provide dates for signature blocks (e.g., as opposed to pre-populating dates). The system may inhibit the signature of signature blocks by the notary until the rules are satisfied (e.g., acknowledgement received, date provided, etc.).

In some implementations, the system may identify signature blocks or lines by identifying the metadata and/or software keys associated with the signature blocks or lines. The system may scan the documents for the metadata, such as white text within a PDF document, or software keys, present the portion for signature by a user, and insert the appropriate signature in the signature block or line.

After the documents have been signed (e.g., an indication of approval is received from a user) and/or the documents have been generated, the documents may be reviewed, saved, registered with an electronic registry (e.g., a repository that securely stores data), and/or transmitted to the appropriate lender.

In some implementations, the interface generated and/or presented to a user may depend on the type (e.g., lender, title company, borrower, seller, etc.) of user requesting accessing. For example, the borrower may be able to access different documents that a seller (e.g., the seller may not be able to access the lender documents for a borrower). As another example, a lender may be able to view real estate transaction documents for a plurality of real estate transactions that are currently pending, have been completed, or are in the process of being completed.

Figure 11:
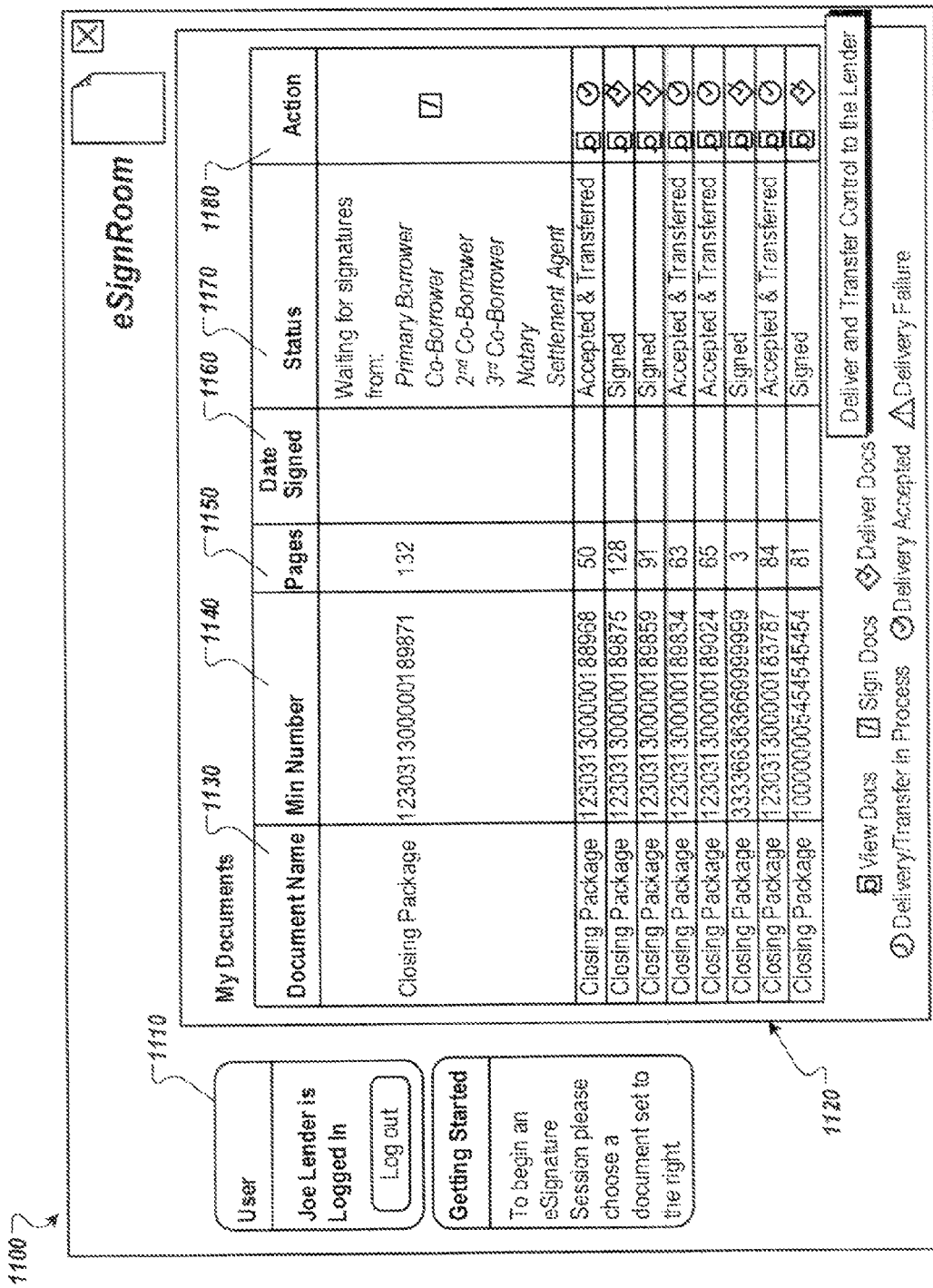
FIG. 11 illustrates an example of an interface for presenting documents for a lender.

FIG. 11 illustrates an example interface 1100 generated for a lender. A lender may access the interface through, for example, the Internet. A lender may log onto the interface using a user name and/or password. The interface 1100 may identify the logged in user 1110 and present a plurality of real estate transaction documents 1120 associated with the lender. The lender may sort and/or search the real estate transaction documents 1120 associated with the lender through the interface 1100. The interface may provide information about the real estate transaction documents 1120 such as document name 1130, identifying number 1140, number of pages 1150, date the documents were signed 1160, status 1170, and/or actions that can be performed to the documents 1180. The status 1170 may indicate whether, for example, the documents have been signed, what parties have signed and/or not signed the documents, whether the signed documents have been generated, whether the signed documents have been transferred to complete the transaction and/or for storage in a memory, etc. Although the interface 1100 generated has been described in terms of a lender's customized interface, the interface may be generated and customized for various other types of users. For example, a title company's interface may allow a title company to upload survey information. As another example, a borrower's interface may allow the borrower to access the co-borrower's signed documents.

Figure 12:
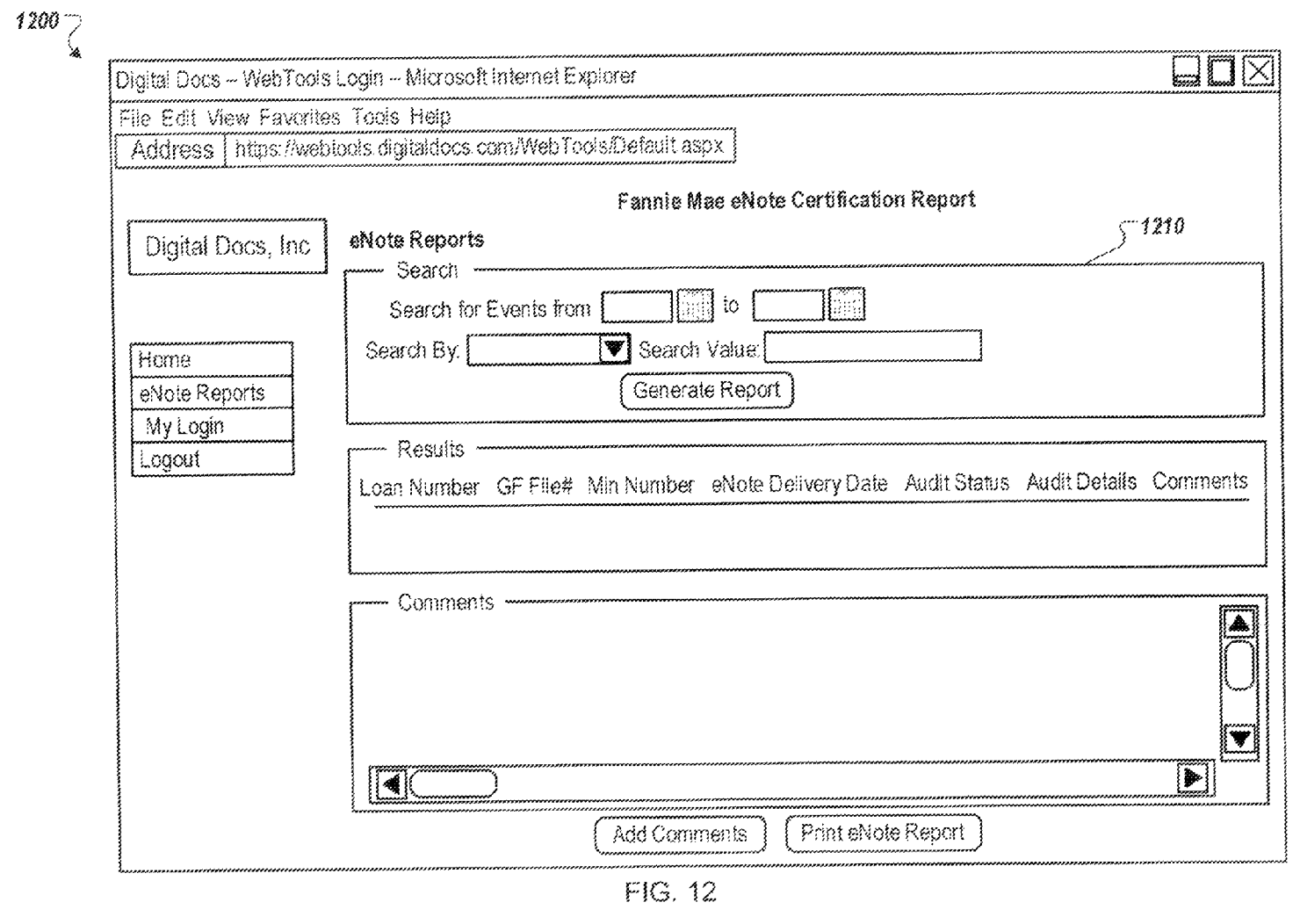

In some implementations, various reports may be created. For example, the a certification report may be generated. As illustrated in FIG. 12, a Fannie Mae eNote Certification Report may be generated and presented to, for example, a lender on the interface 1120. The interface 1200 may facilitate searching for certification reports and may present various certification reports satisfying the searching criteria 1210. The certification report may be automatically transmitted to the appropriate party, such as Fannie Mae.

In some implementations, various consent agreements may be presented to the user as pop-up windows. For example, a pop-up window may be generated as a portion of the interface to provide consent to electronic signature of a document. As another example, a pop-up window may be generated to receive consent or agreement to the terms of the documents being signed.

Figure 13:
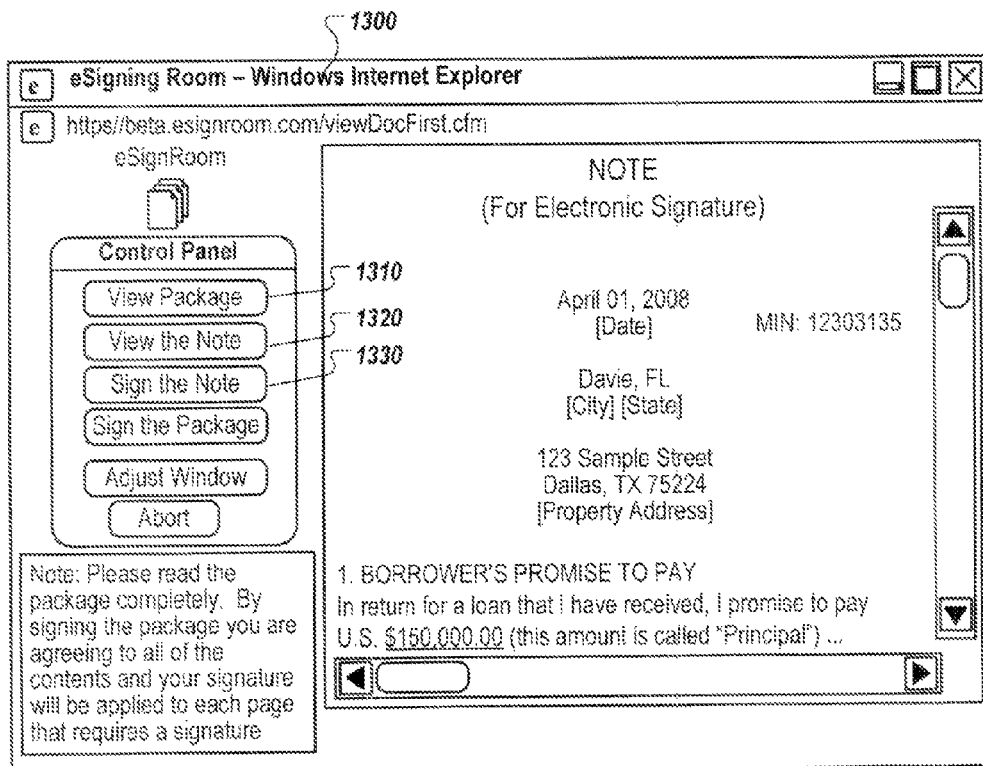
FIG. 13 illustrates an example of an interface for presentation of a note for a real estate transaction.
Figure 14:
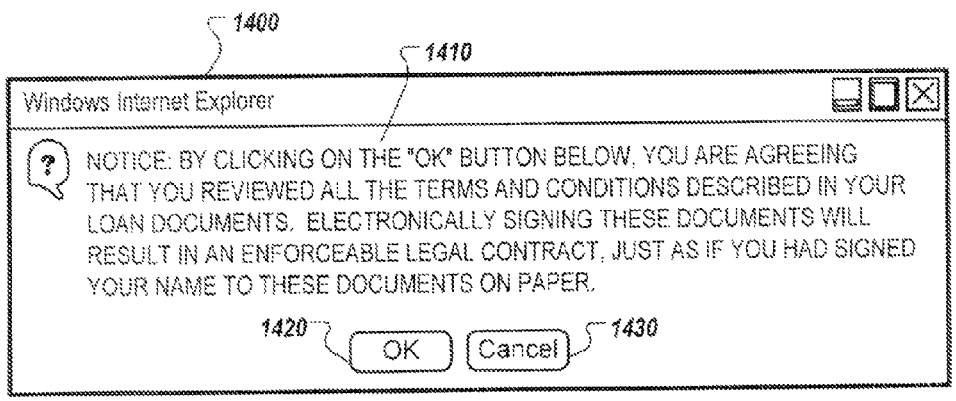
FIG. 14 illustrates an example of an interface for presenting a notice.
Figure 15:
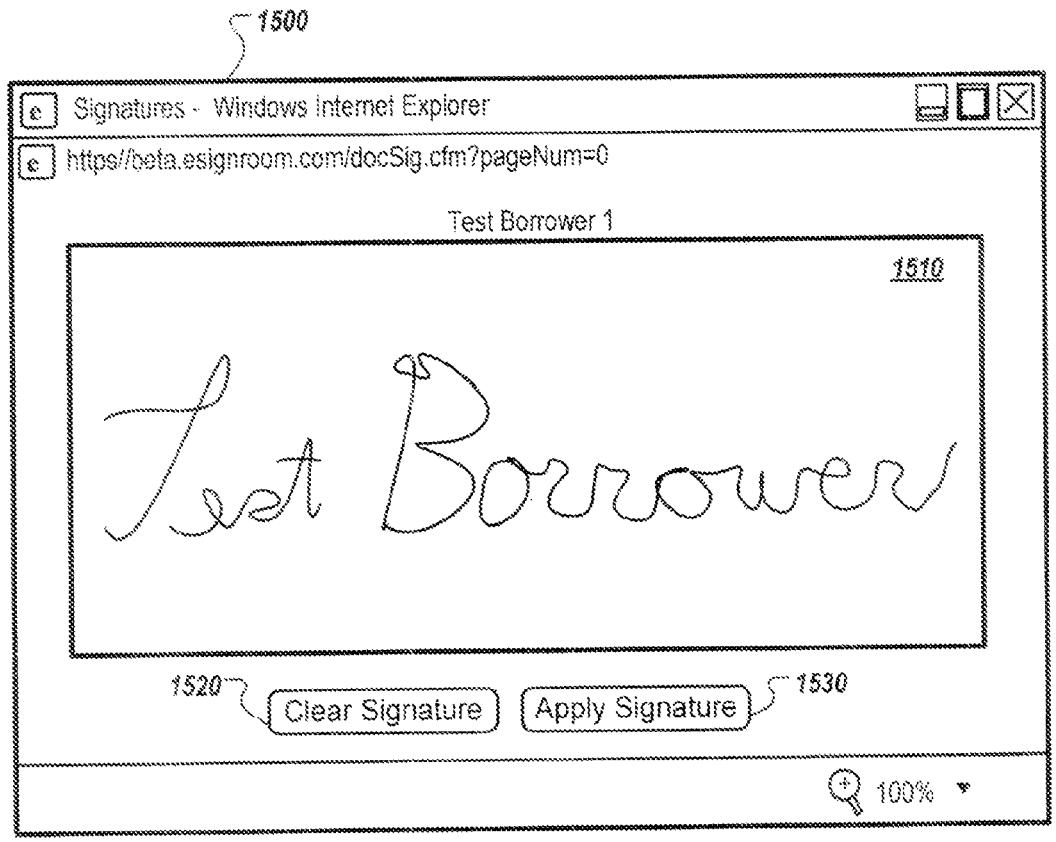
FIG. 15 illustrates an example of an interface for presenting a received signature.
Figure 16:
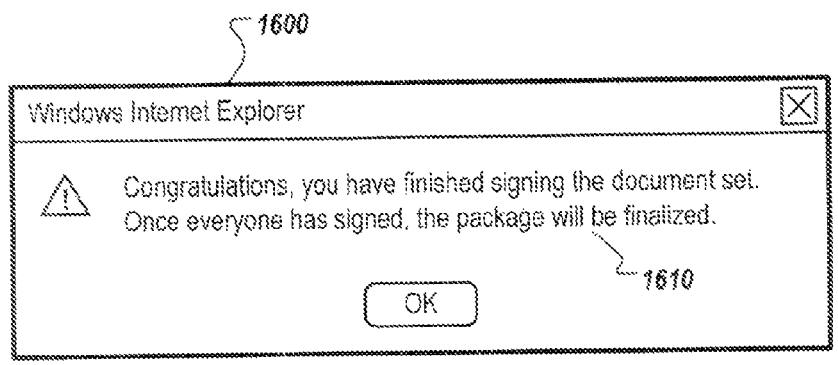
FIG. 16 illustrates an example of an interface for presenting a notice.

FIG. 13 illustrates an example of an interface 1300 presenting a note for review and/or signature by a borrower. The interface 1300 may include a link 1310 that allows the borrower to view the package of real estate transaction documents, a link 1320 that allows the user to view just a portion, such as the note of the real estate transaction documents, and/or a link 1330 that allows the borrower to sign the note. When a borrower selects the link 1330 to sign the note, an interface, such as interface 1400, may be generated. As illustrated in FIG. 14, interface 1400 may be a pop-up window to receive a consent to the agreement. The interface 1400 may include a notice 1410 that a consent to the agreement will be received. The interface 1400 may also include a link 1420 to accept or consent to the agreement or notice and/or a link 1430 to reject the agreement. If a user accepts or consents to the agreement by selecting the link 1420 that indicates acceptance of the agreement, a signature interface 1500 may be generated. As illustrated in FIG. 15, an interface 1500 to receive a signature may be generated. The interface 1500 may present signature(s) received 1510 and/or allow a user to select a link 1520 to clear or remove the signature and a link 1530 to accept the signature presented. If the user or borrower accepts the signature presented, an interface, such as interface 1600, may be generated to provide a notice to the user. FIG. 16 illustrates an interface 1600 that presents a notice 1610 that the documents have been signed and the signed real estate transaction documents will be generated after all parties have signed the documents.

Figure 17:
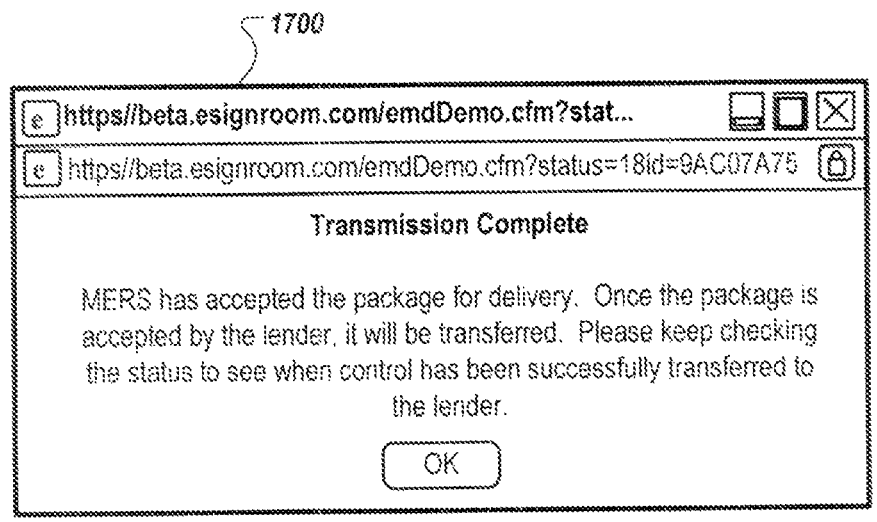
FIG. 17 illustrates an example of an interface for presenting a notice.

As another example, a pop-up window may be used to indicate that the signed real estate transaction documents have been transmitted to a third party for secure storage (e.g., access information to the documents may be recorded and/or the documents may be sealed). FIG. 17 illustrates an example interface 1700 that presents a notice that the documents have been transmitted for storage and for acceptance by the lender.

Although the above implementation describes a specific type of certification report for Fannie Mae, certification reports for other parties and/or other types of reports may be generated, presented, and/or transmitted to appropriate parties.

Although a user (e.g., lender, buyer, seller, trust, etc.) has been described as human, a user may be a person, a group of people, a person or persons interacting with one or more computers, and/or a computer system. A user computer may describe one or more computers and/or computer systems.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer (e.g., host or external host) having a display device (e.g., a CRT (cathode ray tube) or LCD (liquid crystal display) monitor) for displaying information to the user, a keyboard, and a pointing device (e.g., a mouse or a trackball) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the systems and techniques described herein), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In addition, the systems may include various security technologies that may restrict access to documents and data, as appropriate. For example, users may need to provide user information (e.g., user name, password, biometric data, and/or combinations thereof) to receive access to the documents. In addition, data may be stored in a secure form on the system. Various other security technologies (e.g., metadata, private key infrastructures, public key infrastructures, etc.) may be implemented in the system to comply with government and/or industry regulations and/or standards.

A number of implementations have been described. Nevertheless, it will be understood that various modifications may be made without departing from the spirit and scope of the invention. Accordingly, other implementations are within the scope of this application.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a document" includes two or more documents and reference to "an input device" includes a combination of two or more or different types of input devices.

What is claimed is:

1. A method performed by one or more processors for managing real estate transaction documents, the method comprising:

receiving a request for access to real estate transaction documents;

presenting a first portion of the real estate documents including a first signature block and a second signature block;

blocking presentation of a second portion of the real estate transaction documents based on an identity of a user currently logged into a system for managing real estate transaction documents;

identifying the first signature block and the second signature block by presenting one or more signature indicators in the real estate transaction documents, wherein a signature indicator is associated with a signature block;

requesting signature of the first signature block of the first portion of the real estate transaction documents;

prior to receiving the requested signature, receiving a request to enter a signature of the second signature block of the first portion of the real estate transaction documents;

determining that the request to enter the signature of the second signature block prior to receiving the requested signature violates at least one rule prohibiting signature of the second signature block;

inhibiting signature of the second signature block while the first signature block is unsigned;

presenting a notification indicating that signature of the first signature block is required before a signature of the second signature block can be entered; and receiving a signature of the presented portion of the real estate transaction documents, wherein the received signature is associated with at least the first signature block.

2. The method of claim 1 wherein the signature indicator includes metadata that identifies a portion of the real estate transaction document as a signature block.

3. The method of claim 1 wherein the signature indicator may be text.

4. The method of claim 1 further comprising generating the real estate transaction documents.

5. The method of claim 1 further comprising generating signed real estate transaction documents based on the received signature.

6. The method of claim 5 further comprising generating the signed real estate transaction documents such that access is inhibited.

7. The method of claim 5 further comprising storing the signed real estate transaction documents.

8. The method of claim 5 further comprising transmitting the signed real estate transaction documents to a remote system for storage.

9. The method of claim 5 wherein the signed real estate transaction documents are generated such that when the signed real estate transaction documents are accessed, information related to the access is stored in association with the signed real estate transaction documents.

10. The method of claim 5 further comprising transmitting the signed real estate transaction documents to a device of a user that provided the signature of the presented portion of the real estate transaction documents.

11. The method of claim 1 further comprising inhibiting signature by a notary public prior to receiving the signature of the presented portion of the real estate transaction documents.

12. The method of claim 1 further comprising:

determining whether a user has consented to electronically signing the real estate transaction documents; and inhibiting the signature of the presented portion if the user has not consented to the electronic signing.

13. The method of claim 1, wherein the presented portion of the real estate transaction documents is determined based on an identity of a user currently logged into a system for managing real estate transaction documents, the method further comprising inhibiting signature of a third signature block based on the identity of the user.

14. The method of claim 1, wherein the at least one rule prohibiting signature of the second signature block of the presented portion of the real estate transaction documents prior to receiving a signature in the first signature block is based on a specified sequence of signatures of the document retrieved from memory.

15. An article comprising machine-readable medium storing instructions for managing real estate transaction documents, the instructions operable to cause one or more data processing apparatus to perform operations comprising:

receiving a request for access to real estate transaction documents;

presenting a first portion of the real estate documents including a first signature block and a second signature block;

blocking presentation of a second portion of the real estate transaction documents based on an identity of a user currently logged into a system for managing real estate transaction documents;

identifying the first signature block and the second signature block by presenting one or more signature indicators in the real estate transaction documents, wherein a signature indicator is associated with a signature block;

requesting signature of the first signature block of the first portion of the real estate transaction documents;

prior to receiving the requested signature, receiving a request to enter a signature of the second signature block of the first portion of the real estate transaction documents;

determining that the request to enter the signature of the second signature block prior to receiving the requested signature violates at least one rule prohibiting signature of the second signature block;

inhibiting signature of the second signature block while the first signature block is unsigned;

presenting a notification indicating that signature of the first signature block is required before a signature of the second signature block can be entered; and receiving a signature of the presented portion of the real estate transaction documents, wherein the received signature is associated with at least the first signature block.

16. The article of claim 15 wherein the instructions are further operable to cause one or more data processing apparatus to perform operations comprising generating one or more signature indicators for the real estate transaction documents by identifying specified text in the real estate transaction documents.

17. The article of claim 15 wherein the instructions are further operable to cause one or more data processing apparatus to perform operations comprising generating one or more signature indicators for the real estate transaction documents by identifying metadata in the real estate transaction documents.

18. A system for managing real estate transaction documents, the system comprising:
a memory storing real estate transaction documents; and
a document manager adapted to:
receive a request for access to real estate transaction documents;
presenting a first portion of the real estate documents including a first signature block and a second signature block;
block presentation of a second portion of the real estate transaction documents based on an identity of a user currently logged into a system for managing real estate transaction documents;
identify the first signature block and the second signature block by presenting one or more signature indicators in the real estate transaction documents, wherein a signature indicator is associated with a signature block;
request signature of the first signature block of the first portion of the real estate transaction documents;
prior to receiving the requested signature, receive a request to enter a signature of the second signature block of the first portion of the real estate transaction documents;
determine that the request to enter the signature of the second signature block prior to receiving the requested signature violates at least one rule prohibiting signature of the second signature block;
inhibit signature of the second signature block while the first signature block is unsigned;
present a notification indicating that signature of the first signature block is required before a signature of the second signature block can be entered; and
receive a signature of the presented portion of the real estate transaction documents, wherein the received signature is associated with at least the first signature block.

19. The system of claim 18, wherein the document manager is further configured to generate signed real estate transaction documents based on the received signature by applying the received signature to the one or more signature blocks in the presented portion of the real estate transaction documents.

20. The system of claim 18 wherein the memory stores rules based on at least one of government rules or industry standards; and further comprising a rules engine configured to apply the rules to the real estate transaction documents.

* * * * *